United States Patent [19]

Makino et al.

[11] Patent Number: 4,825,405
[45] Date of Patent: Apr. 25, 1989

[54] PRINTER CAPABLE OF PRINTING THE SAME DATA REPEATEDLY ON A PLURALITY OF COPIES

[75] Inventors: Kuniyasu Makino; Yuji Okamoto, both of Nagoya, Japan

[73] Assignee: Brother Kogyo Kabushiki Kaisha, Nagoya, Japan

[21] Appl. No.: 178,856

[22] Filed: Apr. 8, 1988

Related U.S. Application Data

[63] Continuation of Ser. No. 8,096, Jan. 23, 1983, abandoned, which is a continuation of Ser. No. 541,916, Oct. 14, 1983, abandoned.

[30] Foreign Application Priority Data

Oct. 16, 1982 [JP] Japan ................................ 57-181527
Feb. 3, 1983 [JP] Japan ................................ 58-17913

[51] Int. Cl.$^4$ .............................................. G06F 3/12
[52] U.S. Cl. .................................................. 364/900
[58] Field of Search ... 364/200 MS File, 900 MS File, 364/519; 101/46; 400/61, 62, 63, 70, 74, 76

[56] References Cited

U.S. PATENT DOCUMENTS

| | | | |
|---|---|---|---|
| 4,220,417 | 9/1980 | Sprott et al. | 364/900 |
| 4,285,591 | 8/1981 | Botte et al. | 355/14 C |
| 4,386,415 | 5/1983 | Chadra | 364/900 |
| 4,452,136 | 6/1984 | Boynton et al. | 364/900 |
| 4,491,933 | 11/1985 | Thomas et al. | 364/900 |
| 4,509,138 | 4/1985 | Hayashi et al. | 364/709 |

*Primary Examiner*—David Y. Eng
*Attorney, Agent, or Firm*—Moonray Kojima

[57] ABSTRACT

A printer comprising circuitry for selectively switching between an external unit connection mode and an external unit disconnection mode; circuitry for storing data supplied through the external unit in a buffer memory of the printer; and device for reprinting data stored in the buffer memory in the external unit disconnection mode. The reprinting device is suitably actuated to repeatedly print out data stored in the buffer memory, to provide a required number of copies.

3 Claims, 11 Drawing Sheets

PRINTER CAPABLE OF PRINTING THE SAME DATA REPEATEDLY ON A PLURALITY OF COPIES

This is a continuation of Ser. No. 008,096 filed 1/23/83, now abandoned which is a continuation of Ser. No. 541,916 filed 10/14/83, now abandoned.

BACKGROUND OF THE INVENTION

1. Field of Invention

This invention relates to a printer capable of repeatedly printing out sentences based on data fed thereto by an external apparatus.

2. Discussion of Prior Art

A conventional printer of the abovementioned type is usually adapted to temporarily store data fed sequentially thereto in a reloadable buffer memory and to print sentences on shifted out data, fed out by the buffer memory, according to entry of data. In such a conventional printer, however, data corresponding to printed sentences are erased from the buffer memory after completion of printing operation. Thus, when a plurality of copies of the same sentences are required, the same data corresponding to the printed sentences must be fed repeatedly by the external apparatus for each printing operation. Accordingly, conventional printers of this type are inefficient, and leave much to be desired.

SUMMARY OF THE INVENTION.

An object of the invention is to provide a printer capable of printing the same contents of a document repeatedly on a plurality of copies, without the necessity of the external device repeatedly feeding the same data.

Another object is to provide a printer capable of printing the same contents on a plurality of copies without requiring repeated depressions of a copy switch button for each printing operation, thereby improving accessibility and efficiency.

The foregoing and other objects are attained by this invention which encompasses a printer comprising means for clearing contents of a buffer memory in a non-print mode, in which the printer is switched from an on-line mode to an off-line mode; device for feeding data from an external device into the buffer memory according to changes of a memory clear mode to the on-line mode, for printing the contents of the buffer memory once by a printing mechanism; indicating device for indicating a standby mode by detecting the final data of data to be printed out; reprinting device for reprinting the contents of the buffer memory by the printing mechanism in the standby mode, on basis of a reprint instruction signal; and device for changing the standby mode into the non-print mode.

BRIEF DESCRIPTION OF DRAWINGS

FIGS. 8A and 8B are to be taken together, and FIGS. 9A and 9B are to be taken together.

DETAILED DESCRIPTION OF PREFERRED EMBODIMENTS

Figure 1:
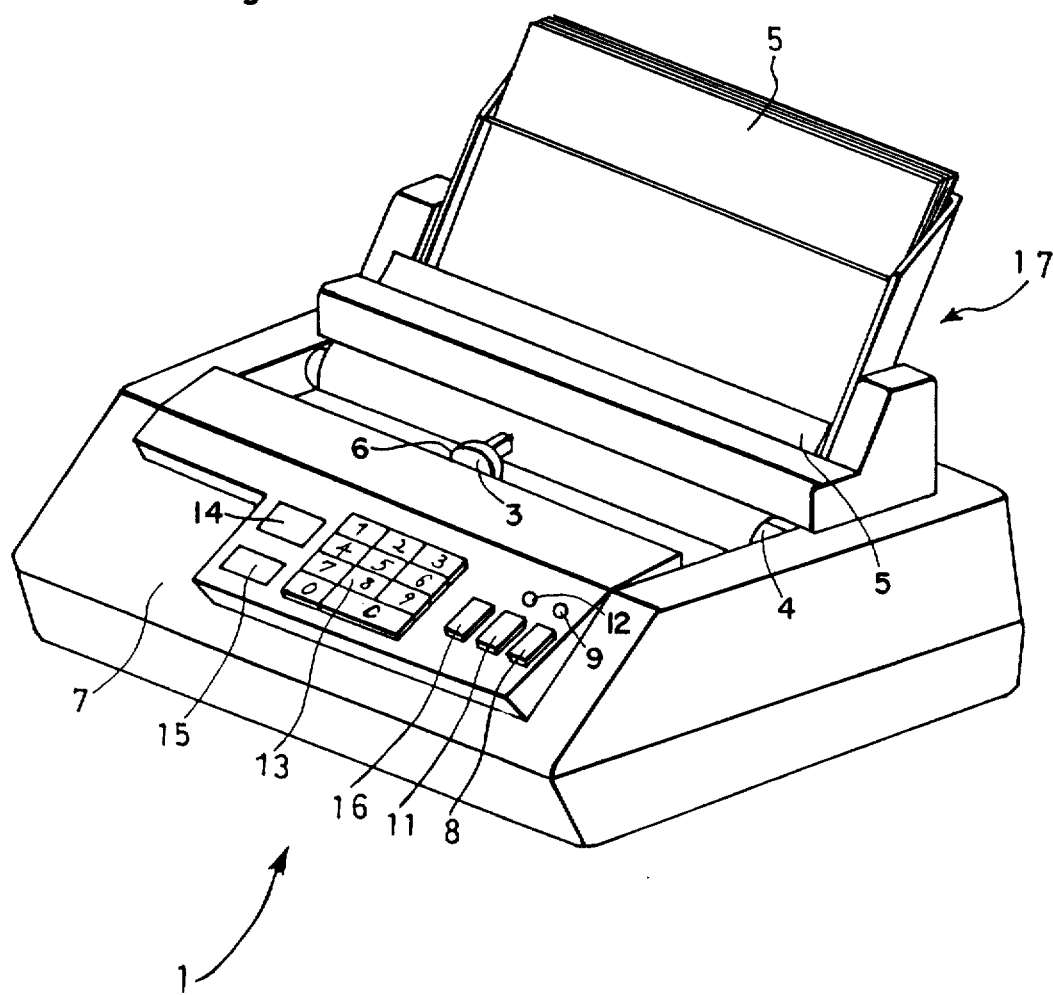
FIG. 1 is a perspective view depicting a printer according to this invention.
Figure 2:
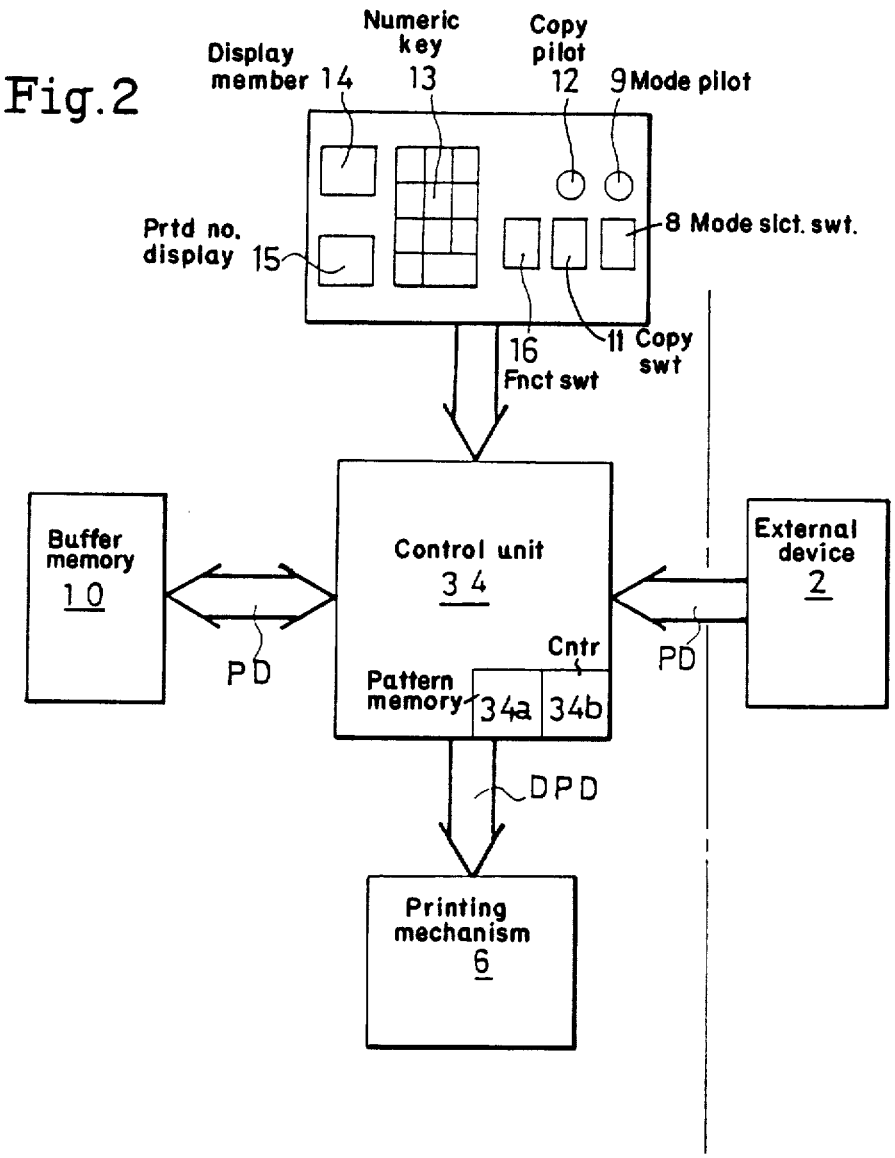
FIG. 2 is a block diagram depicting components of the printer and external device.
Figure 3:
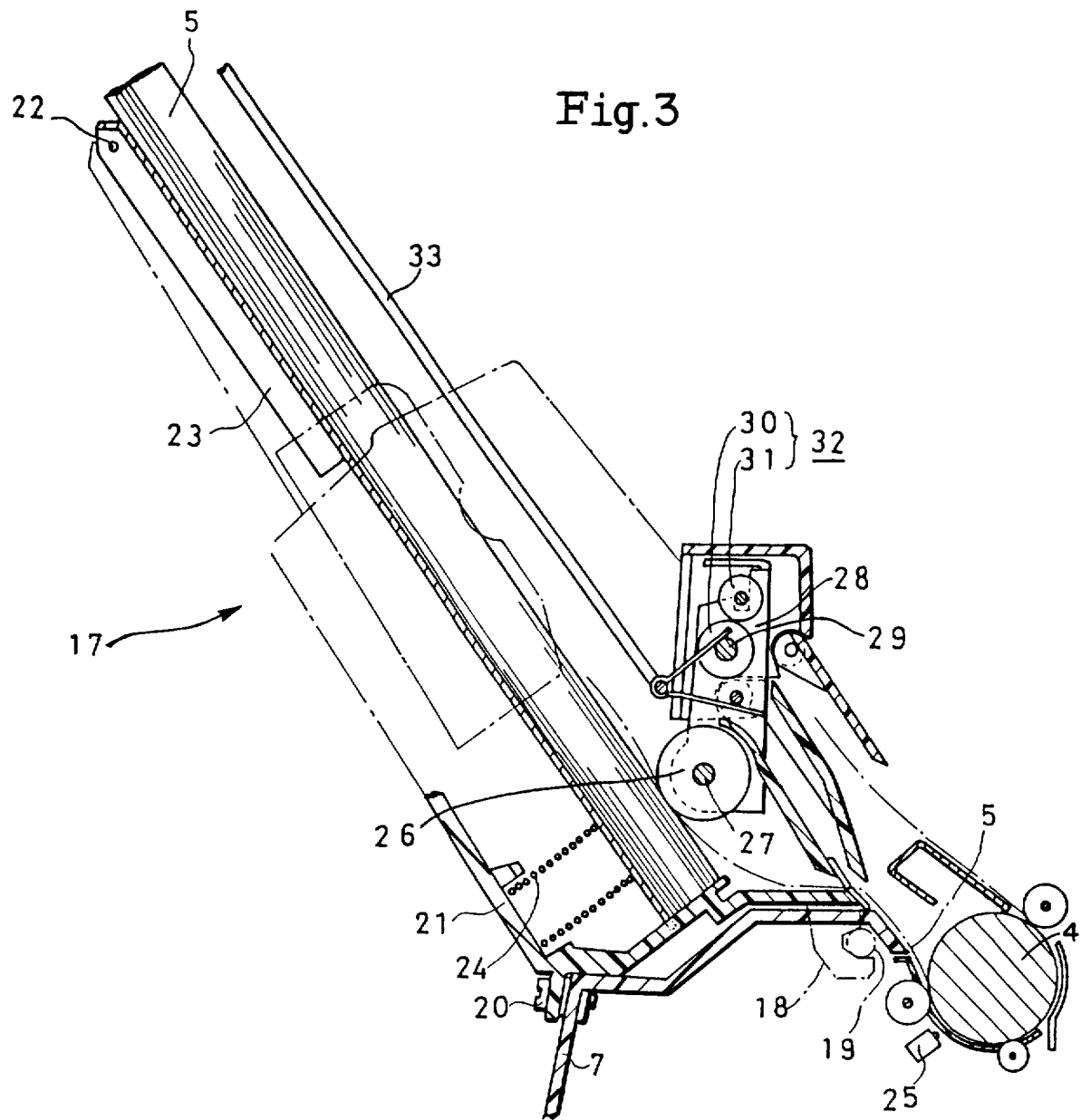
FIG. 3 is a sectional view depicting a sheet feeding device, used in the invention.

Referring now to the drawing, in FIGS. 1,2 and 3, a printer 1 comprises a printing mechanism 6. The printing mechanism 6 includes a printing head 3 which reciprocates along a print line on a print sheet 5 (the term sheet and form are used interchangeably herein and are to be considered to be interchangeable)mounted on a platen 4 and performs printing motion on the basis of print data PD fed by an external device 2 (FIG. 2).

Printing mechanism 6 actuates a plurality of solenoids, not shown, mounted on printing head 3, selectively to drive printing wires, not shown, selectively so that characters corresponding to input print data PD are printed in dot matrices, such as in a manner known in the art.

The button of a mode select switch 8 is used to select one of two possible modes which comprise "on-line mode" and "off-line mode" between printer 1 and external device 2. That is to say, in the on-line mode, the printer is connected to the external device, and in the off-line mode, the two are disconnected from each other.

A mode pilot lamp 9 is lit up when mode select switch 8 is closed to indicate an on-line mode. The button of copy or print switch 11 is used to cause print head 3 to perform printing operation on basis of print data PD stored in a buffer memory 10 (FIG. 2) during the on-line mode, when concurrently mode select switch 8 is opened to change the on-line mode to the off-line mode.

A copy or print pilot lamp is lit to indicate the state of the printer when copy switch 11 is closed. Numeric keys 13 are used to set a required number of copies to be produced by the reprinting operation. A set number displaying member 14 is used to display the number of copies set by depressing numeric keys 13. A printed number displaying member 15 is used to indicate the number of printed copies which have been made by the reprinting operation. The key of a function switch 16 may be a line feed switch to line feed copy sheet 5 through rotation of platen 4. The aforementioned keys and buttons are arranged on a control panel of the front top surface of main case 7 of printer 1, as depicted in FIGS. 1 and 2 and are connected to a control unit (FIG. 2).

Copy pilot lamp 12 lights up when print data PD is retained in buffer memory 10 or when print data PD, stored in buffer memory 10, is printed out in the off-line mode. Print or copy pilot lamp 12 flickers upon completion of printing of print data PD stored in the buffer memory 10 or when printing operation is interrupted.

Figure 4:
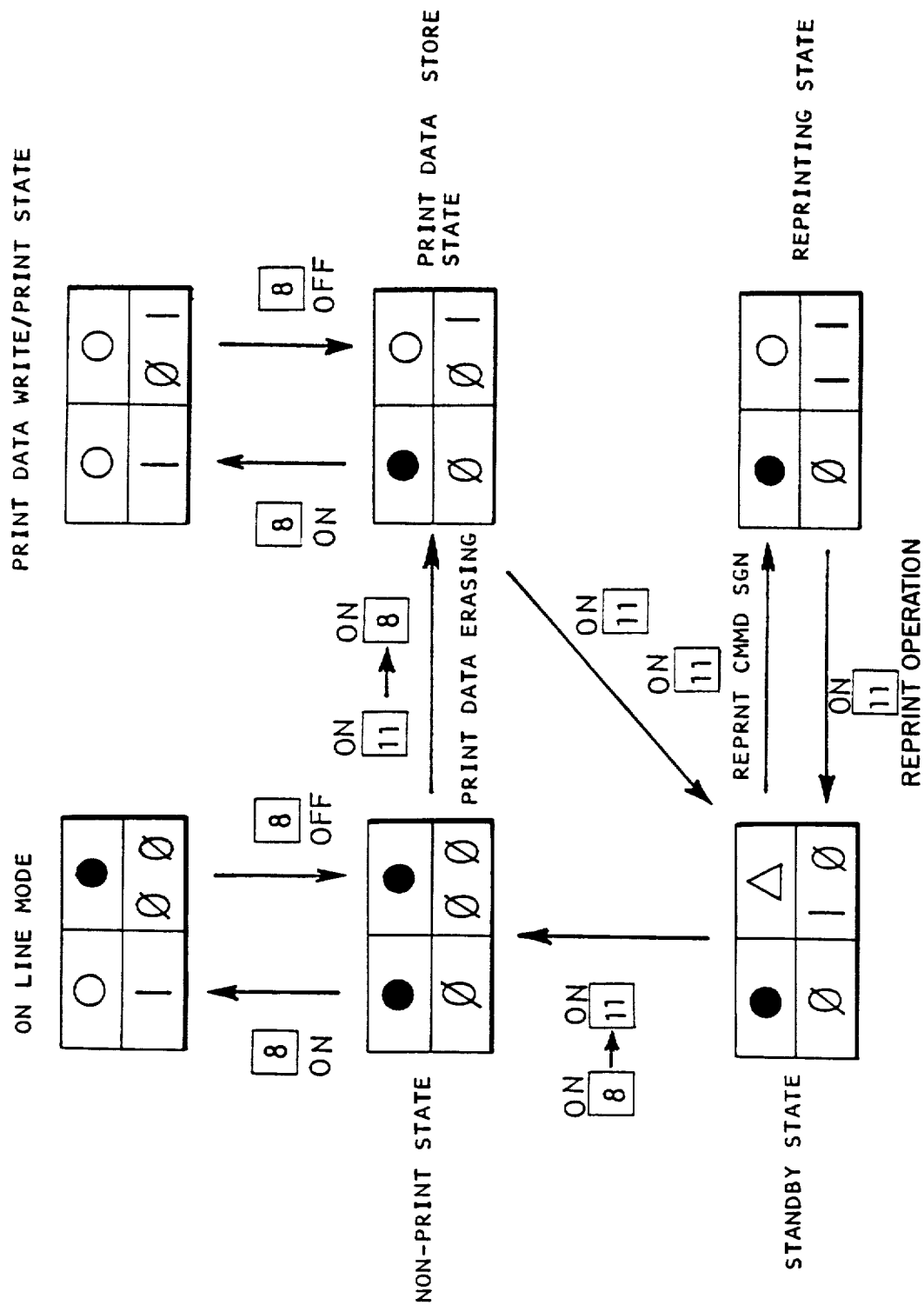
FIG. 4 is an explanatory illustration of the mode transfer operation.

Turning to FIG. 4, there is depicted the different states of the lamps and modes during operation. In each block, the top left section indicates a lit or unlit state of mode pilot lamp 9. The top right section indicates a lit, unlit or flickering state of copy or print pilot lamp 12. The bottom left section indicates a flag indicating on-line mode. The bottom right section indicates the state of the printer. The symbols used signify the following: solid circle (●)=unlit; open circle (○)=lit; open triangle (◇)=flickering.

Thus, copy pilot lamp 12 lights up when the printer is in a "01" state, wherein print data PD is retained in the buffer memory 10 and when the printer is in a "11" state wherein the print data PD stored in buffer memory 10 is reprinted. Copy pilot lamp 12 flickers when the printer is in a "10" state, wherein print data PD stored in buffer memory 10 has been completely printed, or when the printing operation has been interrupted.

As depicted in FIG. 3, a sheet or form feeding device 17 is secured to main case 7 with a hook 18, formed in the upper side of the front end thereof, engaged with a short shaft 19 fixed to main case 7 and with the lower side of the front end thereof fastened with a screw 20 to main case 7. Sheet feeding device 17 comprises a first stacker 23 swingably supported on a support shaft 22 attached to the rear end of a frame 21; a compression spring 24 disposed between first stacker 23 and frame 21; a feed roller 26, being in contact with the top sheet of a stack of print sheets 5 of a suitable size pressed against feed roller 26, and adapted to be driven in synchronism with platen 4 to feed the top sheet to a print starting position, and a pull roller assembly 32, including a roller 30 attached to a shaft 29 adapted to be driven in synchronism with platen 4 and pivotally mounted on a subframe 28 movably mounted on support shaft 27 of feed roller 26, and a roller 31 resiliently pressed against the roller 30. Sheet feeding device 17 feeds the top sheet of a stack disposed on first stacker 23, to a print start position, through action of feed roller 26; and delivers print sheet 5, after printing, from printing unit 1 to a second stacker 33, through action of pull roller assembly 32.

In FIG. 2 control unit 34 comprises an ordinary central processing unit having a read only memory (ROM) and a random access memory (RAM). The ROM includes a pattern memory 34a for storing various dot pattern data DPD, such as characters and figures, and a program memory, such as for controlling the printer. The control unit 34 is connected to the control panel, external device 2, printing mechanism 6 and buffer memory 10.

When mode select switch 8 is closed, to connect printer 1 to external device 2, the control unit 34, turns on mode pilot lamp 9, to indicate connection of the printer 1 to external device 2, and then stores print data PD, fed by external device 2, sequentially in buffer memory 10. Control unit 34 accesses dot pattern data DPD from a pattern memory 34a on basis of print data PD shifted out from buffer memory 10 according to input of print data PD and feed dot pattern data DPD into printing mechanism 6 to print characters corresponding to print data PD on print sheet 5 in dot matrices. In the on-line mode, printing operation of printing mechanism 6 is controlled by external device 2.

When a plurality of the same documents are desired to be printed first a numeric key or keys 13 corresponding to the number or desired copies, are depressed. A code corresponding to the depressed numeric key or keys is then given to control unit 34.

Figure 5:
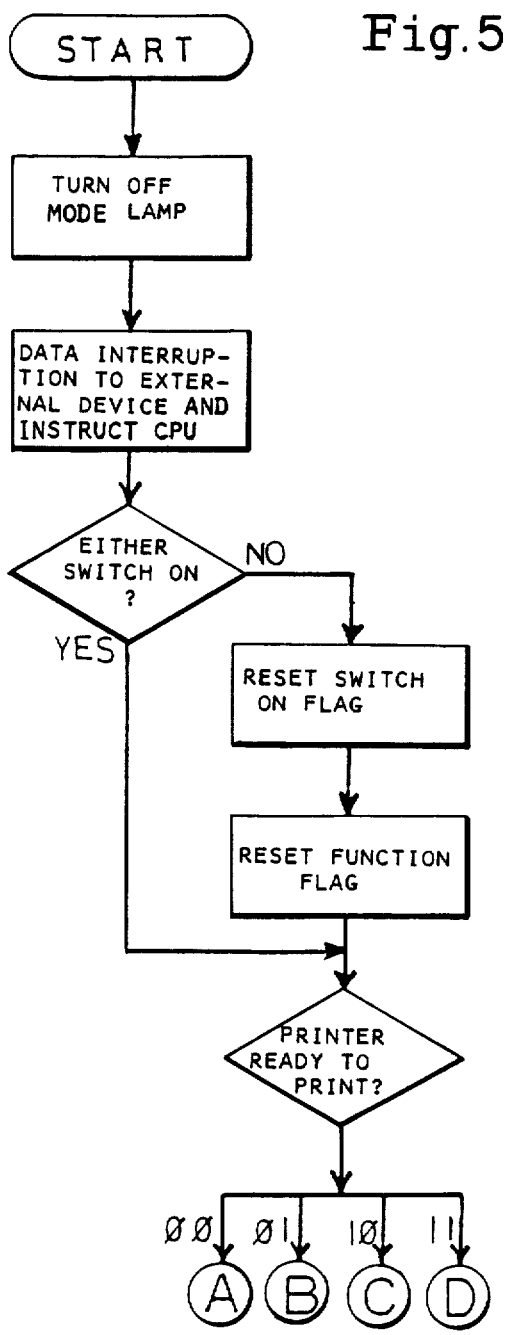
FIGS. 5,6,7,8A,8B, 9A, and 9B, are flow diagrams illustrating the operation of the invention.

As depicted in the flow diagram of FIG. 5, when mode select switch 8 is opened after the code has been given to control unit 34, control unit 34 turns off the mode pilot lamp 9, to indicate disconnection of the printer from external device 2, and instructs external device 2, that control unit 34 has been transferred to a state in which print data PD cannot be received. The control unit 34, then determines whether or not mode select switch 8, copy switch 11, or function switch 16 is closed. Control unit 34 determines the state of printer 1, after having reset the switch-on flags of switches 8, 11 and 16, and a function flag when the determination is NO. When the determination is YES, control unit 34 determines the state of printer 1.

Figure 6:
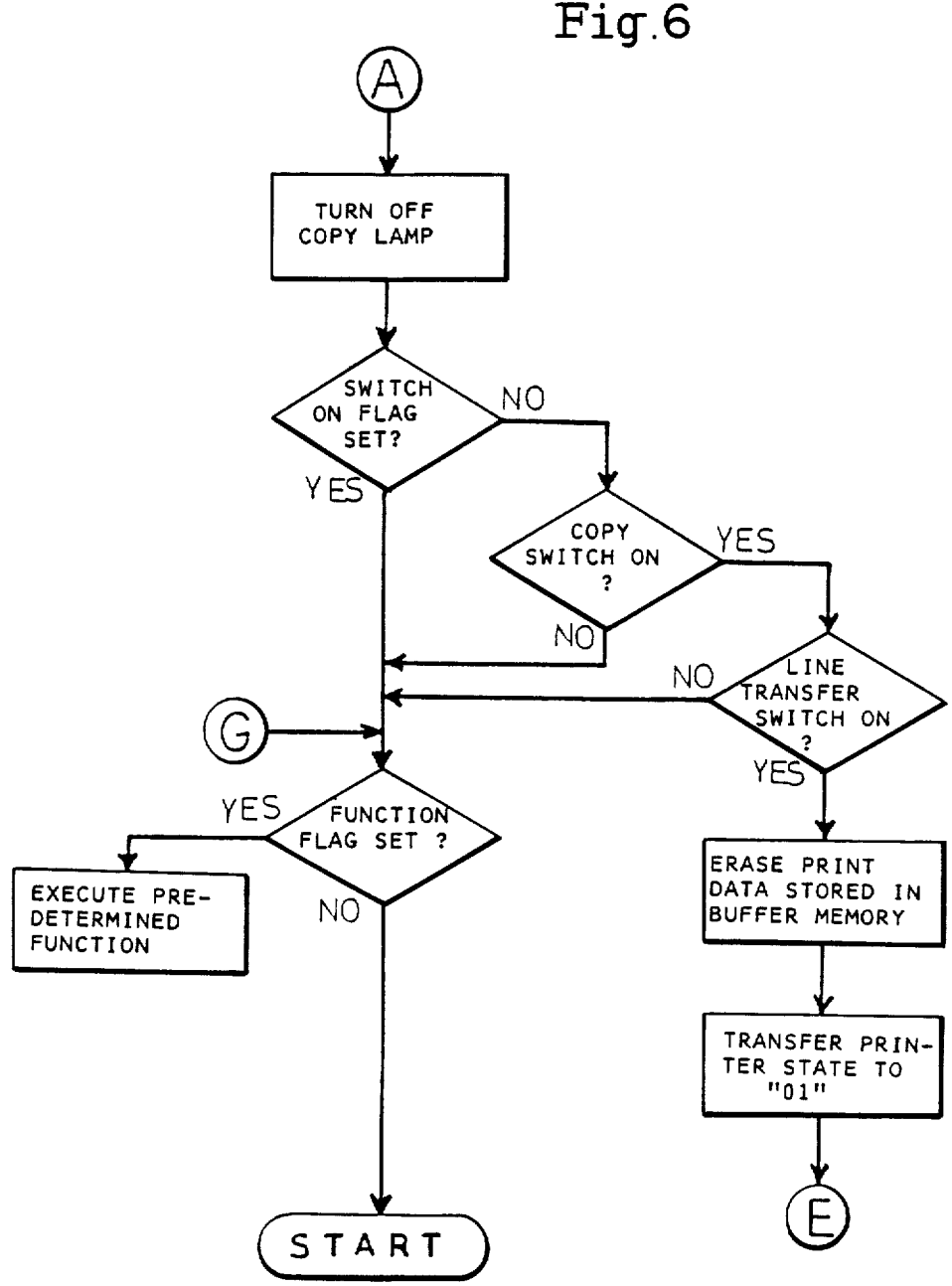

In the foregoing process, if printer 1 is in a non-print "00" state, as depicted in the flow diagram of FIG. 6, control unit 34 turns off copy pilot lamp 12, to indicate that the printer is in a non-print "00" state. Then, the control unit 34 determines whether or not the switch -on flags indicating that mode select switch 8, copy switch 11 and function switch 16, are closed, are set. When the determination is NO, control unit 34 determines whether or not copy switch 11 is closed. If the determination is YES, control unit 34 determines whether or not line transfer-function switch, that is the mode select switch 8, is closed. If both the mode select switch 8 and copy switch 11 are closed, control unit 34 erases all print data PD stored in buffer memory 10, to establish a storable state, and then transfer the state of the printer 1 into print data store state "01" and to routine Step E. as depicted in FIG. 6. Step E is in FIG. 9A.

Also, as depicted in FIG. 6, on the other hand, if any one of the switch on flags of mode select switch 8, copy switch 11 and function switch 16, is set, control unit 34 determines whether or not the set switch on flag is the function flag. If the determination is YES, control unit 34 drives the printer to execute a predetermined corresponding function. If the determination is NO, the process is against returned to START. That is, when the set switch-on flag is the switch -on flag corresponding to the line transfer switch 8 or the copy switch 11, the process is returned to START.

Figure 7:
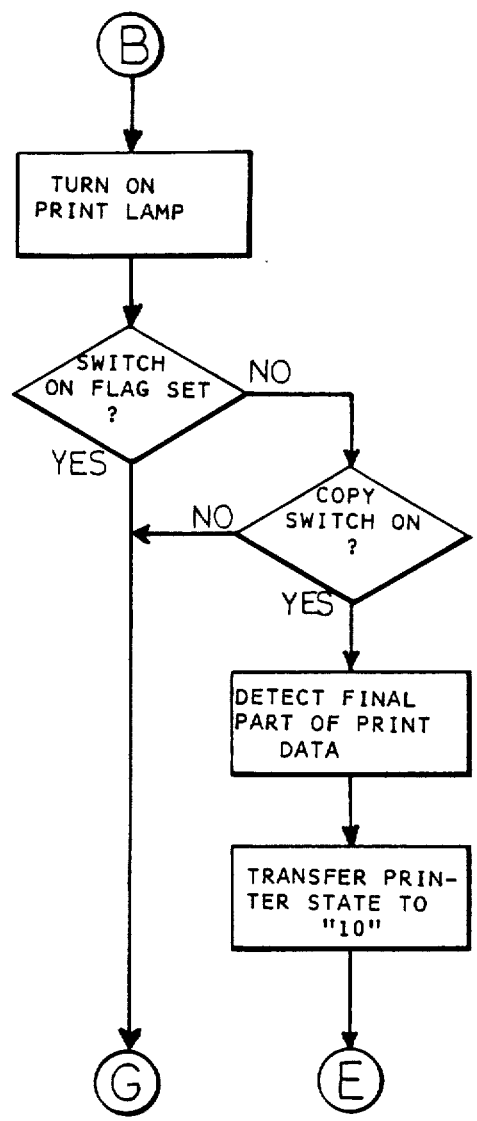

As depicted in the flow diagram of FIG. 7, when mode select switch 8 is closed in this state, mode pilot lamp 9 is turned on to indicate connection of the printer to external device 2. Then, print data PD, corresponding to a desired document and fed by external device 2, is stored in buffer memory 10 and at the same time control unit, 34 accesses dot pattern data DPD from pattern memory 34a and feeds same into printing mechanism 6 on basis of print data PD stored in buffer memory 10, thereby to print out an original copy of print data PD stored in buffer memory 10. When mode select switch 8 is opened after completion of the above printing operation, mode pilot lamp 9 is turned off and printer 1 is disconnected from external device 2. In this state, print data PD stored in buffer memory 10 is retained just as it is.

In the procedure for determining state of printer 1, as shown in FIG. 5, if the printer 1 is in a "01" state for storing print data PD, as shown in FIG. 7, control unit 34 turns on print pilot lamp 12, and then determines whether or not the switch on flag is set. If the determination is NO, control unit 34 determines whether or not copy switch 11 is closed. If the determination is YES, control unit 34 detects the final part of print data PD corresponding to the contents of the printed copy printed during the above-mentioned on-line mode, and then transfers the state of the printer 1 into standby state "10". The routine is then transferred to Step E, as shown in FIG. 7. On the other hand, if the switch-on flag is set or if the copy switch 11 is opened, that is the determinations, respectively, of the first two steps in FIG. 7 is YES and NO , then the routine is transferred to the STEP G of FIG. 6.

Figure 8A:
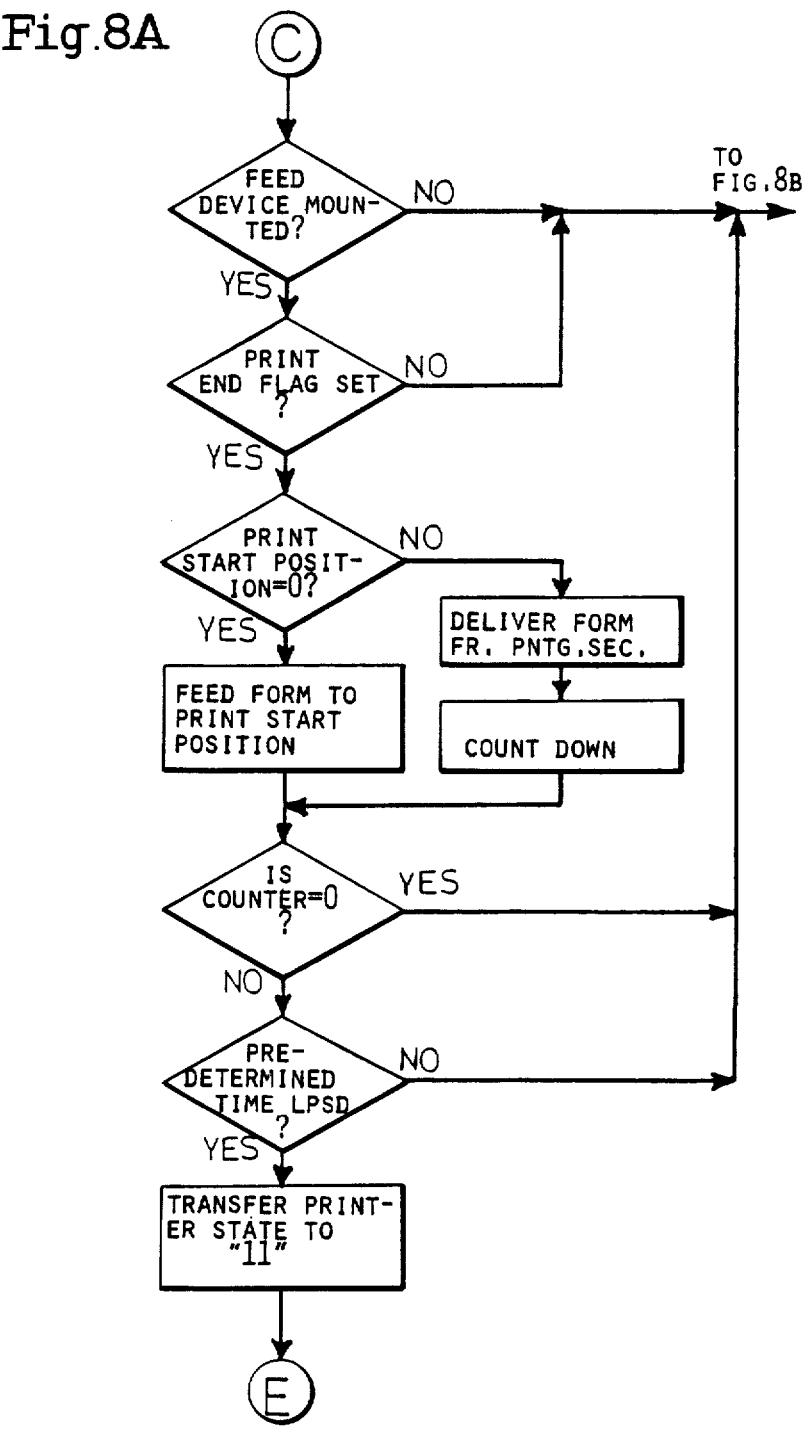
Figure 8B:
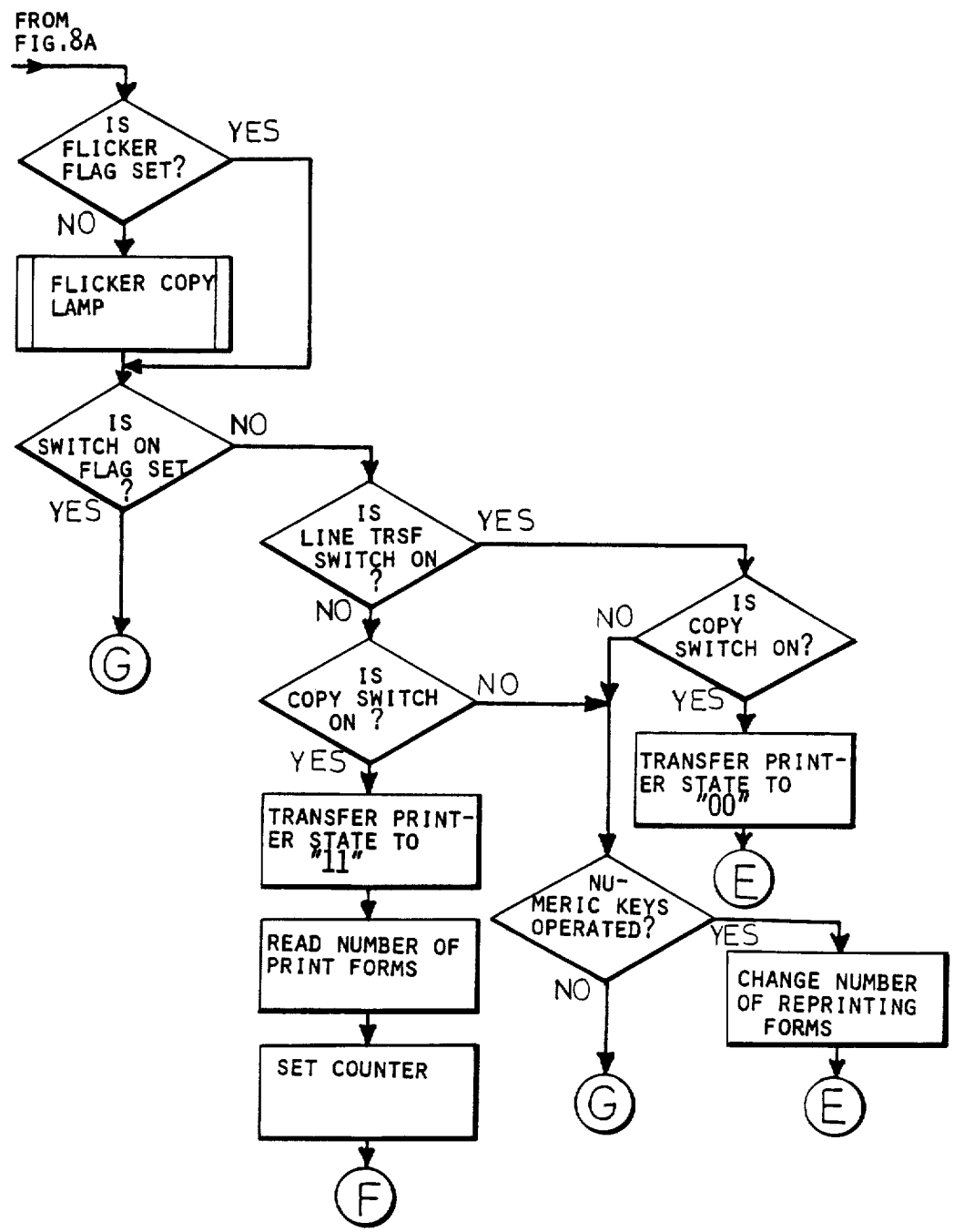

In the routine of FIG. 5, if the printer 1 is in a standby state "10", as shown in the flow diagram of FIGS. 8A and 8B, considered together, control unit 34 determines whether or not sheet feeding device 17 is mounted on printer 1. If the determination is YES, control unit 34 determines whether or not a print end flag is set. If this determination is YES, determination is made whether or not a print sheet 5 is placed at the print start position (when print sheet 5 is not placed at the print start position, this state is represented by "0"). If the determination is YES, feed roller 26, adapted to be driven in synchronism with with platen 4, is actuated to feed top print sheet 5 of a stack of sheets piled on stacker 23, to a print start position. On the other hand, if a print sheet 5 is placed at the print start position, pull roller assembly 32, adapted to be driven in synchronism with platen 4, is actuated to deliver print sheet 5 from the printing section to second stacker 33.

Then, a counter 34b for counting the number of reprint copies is actuated to count down the count. Then, determination is made whether the count of counter 34b is zero. If this determination is NO, determination is made (all the determinations are made by control unit 34) whether a predetermined time for deciding whether the reprinting operation is to be executed on basis of print data PD stored in buffer memory 10 has elapsed. If this determination is YES, the state of the printer is transferred to reprint state "11", and the routine is transferred to Step E of FIG. 9A.

When sheet feeding device 17 is not mounted on printer 1, as shown in FIG. 8A, when the print end flag is not set, or when the count of counter 34b is not zero, or when the above predetermined time has not yet elapsed, as shown now in FIG. 8B, determination is made whether a fluctuating flag that indicates the printer 1 is in a standby state "10" is set. If this determination is NO, copy pilot lamp 12 is flickered to indicate that the printer is in the standby state "10".

After the above operation has been completed, or when the above determination is YES, determination is made by control unit 34, whether or not switch on flag is set. If the determination is YES, the routine is transferred to Step G of FIG. 6.

If the determination is NO, determination is made whether mode select switch 8 is closed. If this determination is NO, determination is made whether copy switch 11 is closed. If this determination is YES, the state of printer 1 is transferred to a reprint "11" state. Then, the number of reprint copies corresponding to the depressed number key or keys 13 is read and the count of counter 34b is set to the read out number and the routine is advanced to step F of FIG. 9A.

If the determination as to mode select switch 8 is YES, (note that line transfer switch is the same as the mode select switch) determination is made whether copy switch 11 is closed. If this determination is NO, determination is made whether numeric keys 13 are operated to change the number of reprint copies. If this determination is NO, the routine is transferred to Step G of FIG. 6, If the determination as to numeric keys is YES, the count of counter 34b is changed to a count corresponding to number instructed by depression of number keys 13. Then the routine is transferred to Step E of FIG. 9A.

Figure 9A:
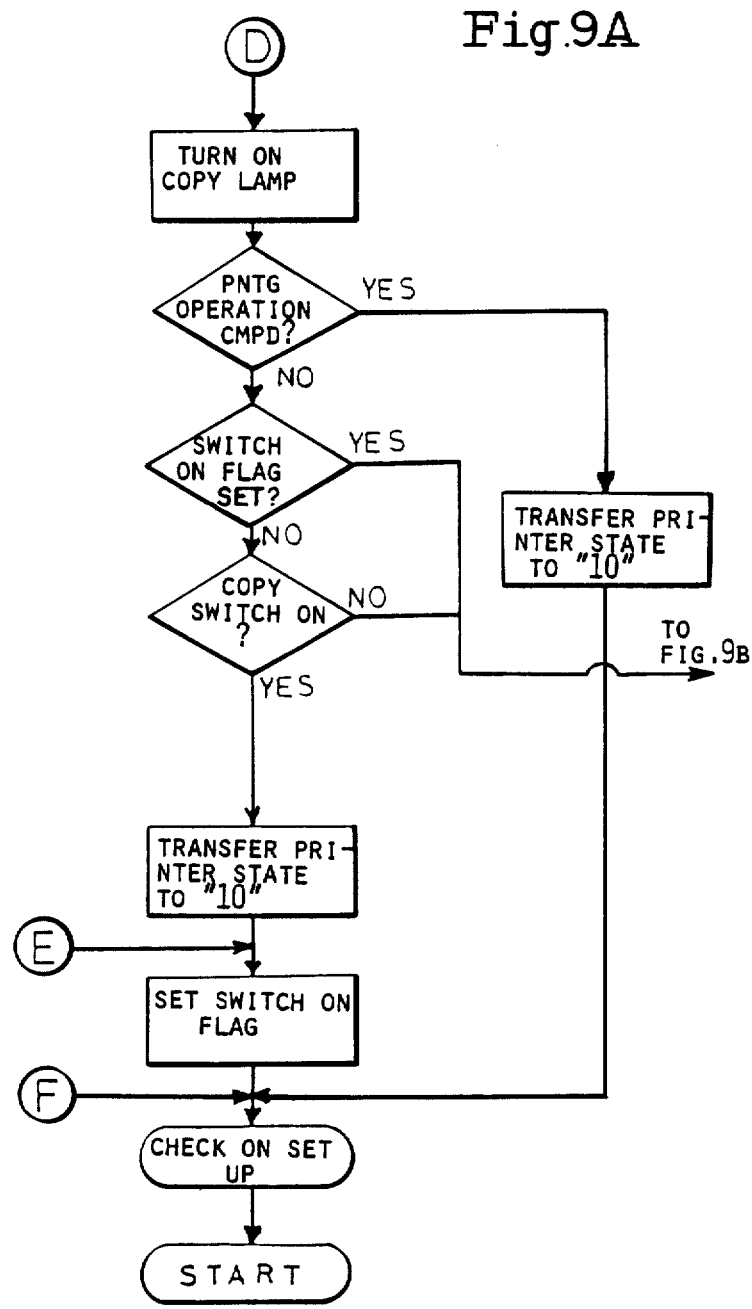

If the determination as to copy switch 11 is YES, the state of printer 1 is transferred to a non-print "00" state and the routine is transferred to Step E of FIG. 9A.

Figure 9B:
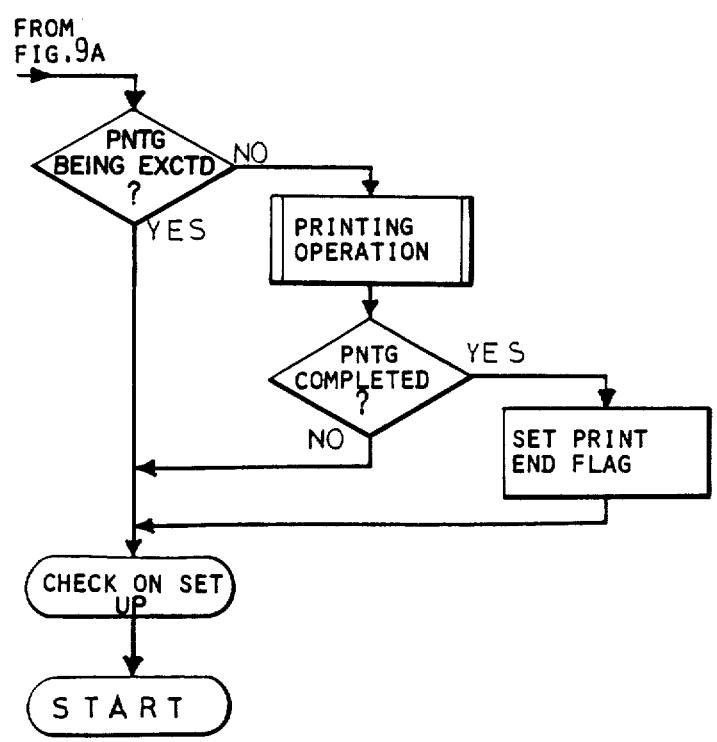

Referring to FIGS. 5 and 9A and 9B, which latter two are to be considered together, if the printer is in a reprint "11" state, copy pilot lamp 12 is turned on. Then determination is made whether print operation has been completed. If this answer is YES, the state of printer 1 is transferred into the standby "10" state. Then, the cover of printer 1, for example, is closed and a check is made to determine whether the printer 1 is ready to operate and the printer is started.

If the determination as to completed printing operation is NO, further determination is made whether switch on flag is set. If this determination is NO, determination is made whether copy switch 11 is closed. If the determination is YES, the state of printer 1 is transferred to a standby "10" state, and then the switch on flag is set. Then, the printer is checked to determine whether the printer is ready to operate and is then started.

If the switch on flag is determined to be on, that is YES, or the copy switch is open, that is NO, determination is made (see FIG. 9B) whether printer 1 is in printing operation. If this determination is NO, the same contents of the document as those printed above in the on-line mode on basis of print data PD stored in buffer memory 10 are reprinted. The determination is made whether reprinting operation has been completed. If this determination is YES, the print end flag is set upon detection of the final part of the print data. Then, the printer is checked to determine whether the printer is ready to operate, and is then started.

If the determination as to completion of printing operation is YES, or printing is completed and determination is NO, the printer is checked to determine whether printer 1 is ready, and then started Thus, without requiring repeated feeding of print data by external devices, for each cycle of printing operation, this invention is capable of repeatedly reprinting the same contents on a plurality of sheets, set beforehand through operation of numeric keys 13, on basis of printing data PD stored in a buffer memory 10 during off-line mode. It is also capable of reprinting the same contents on a plurality of sheets or forms until copy switch 11 is closed. During the repeated printing operation, a plurality of sheets or forms are automatically fed to the print start position and the resulting printed forms or sheets are pulled out from the printing section by the sheet feeding device, all smoothly and efficiently.

Although the embodiment described uses a sheet feeding device 17 of the type designed to feed print sheets previously cut in a predetermined size, to the print start position and to deliver the printed sheet from the printing section, the sheet feeding device is not limited to such type. A pin feed type sheet feeding device which uses margin punched pin fed continuous forms, may also be used. In this latter type of device, the sheets comprise a longitudinally continuous set of forms perforated along the line direction at predetermined intervals to enable parts thereof to be easily separated, and are provided along opposite sides thereof with a plurality of punched holes. These forms may be fed to to the print start position by means of a feed roller driven in synchronism with a platen. Then, the forms are delivered after printing from the print section by means of a pin tractor mechanism driven in synchronism with the platen.

Furthermore, although the present invention has been described as using an impact type print mechanism 6 designed to drive printing wires selectively by means of solenoids to print characters in dot matrices, the print mechanism is not limited thereto. Any suitable print mechanism may be used, such as, for example, thermal transfer print mechanisms or type wheel print mechanism.

The foregoing description is illustrative of the principles of the invention. Numerous modifications and extensions thereof would be apparent to the worker skilled in the art. All such modifications and extensions are to be considered to be within the spirit and scope of the invention.

What is claimed is:

1. A stand alone printer comprising a buffer memory a print head to print individual pieces of data onto a sheet and having an on-line mode in which said printer is connected to an external device and an off-line mode in which said printer is disconnected from said external device, and having data fed into and stored in said buffer memory of said printer by said external device in said on-line mode, and having contents of said buffer memory printed by a printing mechanism, and comprising a manually operated mode switch for selecting one of said one-line mode and said off-line mode between said printer and said external device; a first lamp display means having an ON state, an OFF state, and a flicker state, said flicker state for displaying a standby state upon detection of a final part of data to be printed; a second lamp display means for indicating said on-line and off-line modes; and control means comprising means actuated by manual operation of said mode switch switching from said on-line mode to said off-line mode, for clearing contents of said buffer memory during a non-printing state to produce a memory clear state;

means actuated by manual operation of said mode switch switching from said off-line mode to said on-line mode for storing in said buffer memory data fed by said external device and for causing said printing mechanism to print once contents of said buffer memory without erasing said contents of said buffer memory;

instruction means comprising a plurality of manually operable numeral buttons for instructing a required number of copies to be originally printed with the same data which was previously stored in said buffer memory;

a manually operated copy switch operable during said off-line mode as indicated by said second lamp display means and during said flicker state of said first lamp display means, for switching said printer from said standby state into a reprinting state whereby said first display means goes to an ON state to indicate said reprinting state; and reprinting means for feeding a reprint command signal to said printer to originally print contents of said buffer memory on a desired number of copies as instructed by manual operation of said numeral buttons of said instruction means during said off-line mode and in said reprinting state.

2. A stand alone printer comprising a print head to print individual pieces of data onto a sheet and having an on-line mode in which said printer is connected to an external device and an off-line mode in which said printer is disconnected from said external device and comprising a manual mode switch for selecting one of said on-line mode and off-line mode between said printer and said external device, a first lamp having an On state, an Off state and a flicker state, said On state for indicating a reprint state, said flicker state for indicating a standby state of said printer, a second lamp for indicating an on-line mode and an off-line mode, and a control unit having a buffer memory to store data fed therein by said external device in said on-line mode and having the contents of said buffer memory printed once in said on-line mode and an additional one or more times in said off-line mode by a printing mechanism on copies fed by a copy feeding device, and a manual copy instruct switch operable during said off-line mode as indicated by said second lamp and during a standby state as indicated by said first lamp; said printer further comprising said control unit responsive to manual operation of said copy instruct switch for changing said printer into a reprint state and to change said first lamp into an ON state during said off-line mode from a standby state as indicated by flicker state of said first lamp, and to repeat original printing of contents of said buffer memory said one or more times by repeating a procedure comprising the steps of driving said copy feeding device to feed copies to a print starting position, printing data stored in said buffer memory, on copies set in place, delivering printed copies from a printing section using said copy feeding device after data has been printed on said copies, and print stopping means for stopping execution of said printing procedure upon reception of a print stop command, to thereby transfer state of said printer into said standby state.

3. A stand alone printer comprising a print head for printing individual pieces of data onto a sheet and having an on-line mode in which said printer is connected to an external device and an off-line mode in which said printer is disconnected from said external device, and comprising a manually operated mode switch for selecting one of said on-line mode and said off-line mode between said printer and said external device and a control unit having a buffer memory to store data feed thereinto by said external device in said on-line mode and having the contents of said buffer memory printed once in said on-line mode and one or more times during said off-line mode by a printing mechanism on copies fed by a copy feeding device in said on-line mode and in said off-line mode, and comprising first lamp having an ON state, an OFF state and a flicker state, said flicker state for displaying a standby state of said printer upon detection of a final part of data to be printed, and said ON state indicating a reprint state of said printer, wherein said control unit comprises means actuated by said mode switch from an off-line mode to an on-line mode, for clearing the contents of said buffer memory in a non-printing state to result in a memory clear state, means actuated by said mode switch switching to an on-line state for storing in said buffer memory data fed by said external device and for causing said printer to print once said contents of said buffer memory, instruction means comprising manually actuable numeral switches actuable during said standby state indicated by said flickering state of said first lamp and during said off-mode as indicated by said second lamp, for instructing a required number of copies to be originally printed with the same data which was previously stored in said buffer memory, reprint commanding means for feeding a reprint command signal to said printer in a standby state as indicated by said flicker state of said first lamp, so that the contents of said buffer means are originally printed on copies of a desired number of instructed by said instruction means, copy switch manually operated during said standby state indicated by said flickering state of said first lamp, for switching said printer from said standby state into a reprinting state, and printing control means for causing said printer to reprint, during said off-line mode as indicated by said second lamp and in the reprinting state as indicated by the ON-state of said first lamp, originally the same data on copies of a desired number as instructed by said instruction means, through repetitive steps of feeding said copies to a start print position through operation of said copy feeding device in response to operation of a reprint command means, printing data stored in said buffer memory, on copies set in place and delivering printed copies from said print section.

* * * * *